(12) United States Patent
Channey

(10) Patent No.: US 9,072,117 B1
(45) Date of Patent: Jun. 30, 2015

(54) DISTRIBUTED COMPUTING OVER A WIRELESS AD HOC NETWORK

(75) Inventor: Eric R. Channey, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 13/297,823

(22) Filed: Nov. 16, 2011

(51) Int. Cl.
- H04W 72/12 (2009.01)
- H04W 76/02 (2009.01)
- H04L 12/863 (2013.01)
- H04L 12/861 (2013.01)

(52) U.S. Cl.
CPC ........... *H04W 72/1263* (2013.01); *H04L 47/50* (2013.01); *H04L 49/90* (2013.01); *H04W 76/02* (2013.01)

(58) Field of Classification Search
None
See application file for complete search history.

(56) References Cited

U.S. PATENT DOCUMENTS

| | | | |
|---|---|---|---|
| 6,067,297 A * | 5/2000 | Beach | 370/389 |
| 7,035,431 B2 * | 4/2006 | Blake et al. | 382/103 |
| 7,167,578 B2 * | 1/2007 | Blake et al. | 382/103 |
| 7,379,447 B2 * | 5/2008 | Dunagan et al. | 370/350 |
| 7,493,369 B2 * | 2/2009 | Horvitz et al. | 709/207 |
| 7,516,201 B2 * | 4/2009 | Kovacs et al. | 709/223 |
| 7,584,285 B2 * | 9/2009 | Hudson et al. | 709/228 |
| 7,664,048 B1 * | 2/2010 | Yung et al. | 370/253 |
| 7,734,717 B2 * | 6/2010 | Saarimaki et al. | 709/217 |
| 7,752,276 B2 * | 7/2010 | Aschauer et al. | 709/206 |
| 7,778,739 B2 * | 8/2010 | Preston et al. | 701/1 |
| 7,961,694 B1 * | 6/2011 | Chan et al. | 370/341 |
| 7,984,116 B2 * | 7/2011 | Hudson et al. | 709/219 |
| 8,031,605 B2 * | 10/2011 | Oyman et al. | 370/235 |
| 8,046,454 B2 * | 10/2011 | Song et al. | 709/224 |
| 8,103,247 B2 * | 1/2012 | Ananthanarayanan et al. | 455/411 |
| 8,270,358 B2 * | 9/2012 | Emond et al. | 370/329 |
| 8,332,475 B2 * | 12/2012 | Rosen et al. | 709/206 |
| 8,644,490 B2 * | 2/2014 | Stewart | 379/265.12 |
| 2005/0063328 A1 * | 3/2005 | Dunagan et al. | 370/324 |
| 2005/0257212 A1 * | 11/2005 | Boyles et al. | 717/170 |
| 2006/0074725 A1 * | 4/2006 | Huang et al. | 705/7 |
| 2009/0055132 A1 * | 2/2009 | Cheng et al. | 702/187 |
| 2009/0097397 A1 * | 4/2009 | Moreira Sa de Souza | 370/216 |
| 2009/0180451 A1 * | 7/2009 | Alpert et al. | 370/338 |
| 2010/0150120 A1 * | 6/2010 | Schlicht et al. | 370/338 |
| 2011/0066717 A1 * | 3/2011 | Ahola | 709/224 |
| 2012/0033574 A1 * | 2/2012 | Holm | 370/252 |
| 2012/0151028 A1 * | 6/2012 | Lu et al. | 709/223 |
| 2012/0188979 A1 * | 7/2012 | Haddad | 370/331 |
| 2013/0286942 A1 * | 10/2013 | Bonar et al. | 370/328 |

* cited by examiner

*Primary Examiner* — Gregory Sefcheck
(74) *Attorney, Agent, or Firm* — Thomas | Horstemeyer, LLP (57) ABSTRACT

Disclosed are various embodiments of a telecommunication environment including a wireless transmitter in a first mobile device that enables the first mobile device to communicate over a network infrastructure. An application may be executed in the first mobile device such that the application enables the first mobile device to communicate with a second mobile device over a wireless ad hoc network. The application may further facilitate a requisitioning of a remote computer resource of the second mobile device over the wireless ad hoc network.

23 Claims, 6 Drawing Sheets

DISTRIBUTED COMPUTING OVER A WIRELESS AD HOC NETWORK

BACKGROUND

Cellular networks provide voice and data access to consumers across the country. Along with the connectivity provided by these cellular networks comes widespread use of mobile devices. However, these mobile devices are generally limited to operating within a cellular network.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

A mobile device within a cellular network is provided with access by directly connecting to a cellular network. However, a mobile device that has the functionality to communicate over a cellular network might not be able to attach to the network from time to time because the mobile device is physically out of range. Thus, in a telecommunication environment, there are typically many mobile devices that are in communication over a cellular network and there may be some that are unable to communicate over the cellular network. Rather than relying solely upon the preexisting network infrastructure of the cellular network to provide access, the mobile device itself can be used to improve the telecommunication environment.

This can be done by harnessing the collective resources of the mobile devices within a given geographic location. By adding an appropriate communication system to these mobile devices, the mobile devices can form a wireless ad hoc network that effectively extends the reach of the cellular network. Furthermore, by using the wireless ad hoc network, mobile devices can improve their functionality by sharing computer resources over the wireless ad hoc network. In other words, mobile devices within a particular distance can dynamically form a cloud for expanding network connectivity and increasing net efficiency. In the following discussion, a general description of the system and its components is provided, followed by a discussion of the operation of the same.

Figure 1:
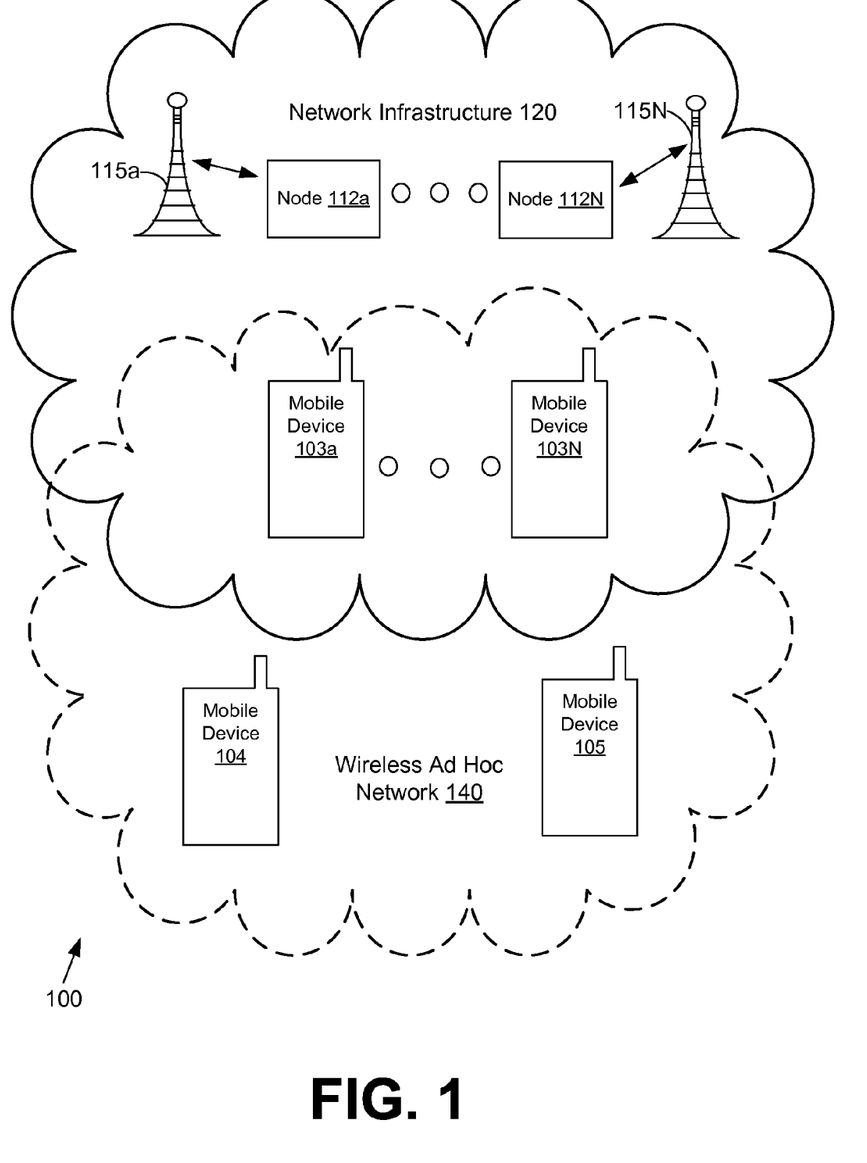
FIG. 1 is a drawing of telecommunication environment according to various embodiments of the present disclosure.

With reference to FIG. 1, shown is a telecommunication environment 100 according to various embodiments. The telecommunication environment 100 includes a network infrastructure 120 that provides communication links among various devices and nodes within the network infrastructure 120. In one example, the network infrastructure 120 is a cellular network. A network infrastructure 120 may include a plurality of nodes 112a-112N. Each of the nodes 112a-112N may be a stationary device or a mobile device. Nodes 112a-112N may each be linked to a transceiver 115a-115N. As an example, the transceiver 115a can be a cellular tower. A network infrastructure 120 may also include many mobile devices 103a-103N. The telecommunication environment 100 may further include a wireless ad hoc network 140. The wireless ad hoc network 140 may include the mobile devices 103a-103N, 104, and 105.

Some mobile devices 103a-103N can be included in both the network infrastructure 120 and the wireless ad hoc network 140. Additionally, some mobile devices 104 and 105 are excluded from the network infrastructure 120.

Next, a general description of the operation of the various components of the telecommunication environment 100 is provided. To begin, the network infrastructure 120 may include a preexisting infrastructure with dedicated components, such as a cellular network, for example. That is to say, the network infrastructure 120 may include hubs, gateways, routers, routing nodes, or any other device that has a predetermined functional purpose for facilitating communication over the network infrastructure. For example, a node 112a-112N within the network infrastructure 120 may have the primary function of providing a single connection point for end devices connected to the network. So, when an end device joins the network, the device necessarily accesses one of a plurality of preexisting access points that has the predetermined function of a hub, gateway, router, or routing node. For example, such access points may comprise a cell tower in a given cell.

The wireless ad hoc network 140, on the other hand, is a network where devices may join the wireless ad hoc network 140 without connecting to a preexisting access point. Thus, as an example, the wireless ad hoc network 140 may consist entirely of mobile devices such that a mobile device can function as both an end device as well as a routing device. Furthermore, this function may be determined dynamically based on need.

Figure 2:
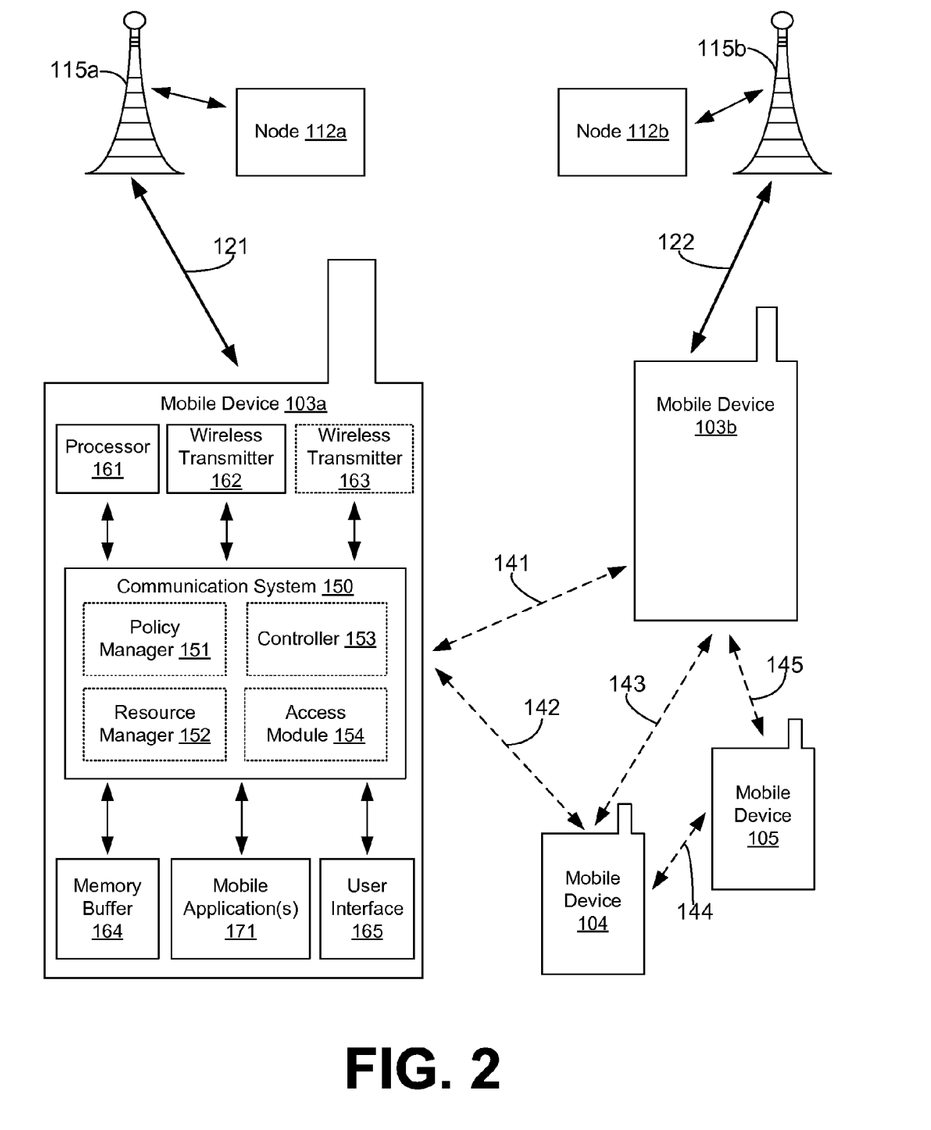
FIG. 2 is a drawing of an example of communication among devices within the telecommunication environment of FIG. 1 according to various embodiments of the present disclosure.

Referring next to FIG. 2, shown is an example of communication links between the various components of the telecommunication environment 100 (FIG. 1) according to various embodiments. It is understood that FIG. 2 provides merely an example of the many different types of functional arrangements that may be employed in the telecommunication environment 100.

As an example, a node 112a, which is part of network infrastructure 120 (FIG. 1), provides network coverage to effectuate a Wide Access Network (WAN). Specifically, the node 112a can be configured to function as an access point providing connectivity for many wireless devices. More so, the node 112a can achieve wide wireless access to wireless devices by a link between the node and a transceiver 115a. In one embodiment of the present disclosure, the transceiver 115a can be a cellular tower and the network infrastructure 120 is a cellular network. In this embodiment, the node 112a may be a cellular hub, base station, or any other routing device of the like such that the node 112a is physically integrated with the transceiver 115a to form a transceiver station. In this case, the link between the node 112a and transceiver 115a is a wired connection.

Network infrastructure 120 may also include a node 112b that can be another access point within a cellular network to extend coverage of the network infrastructure 120. This node may use a transceiver 115b to communicate. In one embodiment of the present disclosure, a first transceiver 115a and a second transceiver 115b are two distinct transceivers separated by a geographical distance.

FIG. 2 further shows an example of a telecommunication environment 100 where one mobile device 103a and another mobile device 103b are included within the network infrastructure 120. In this instance, one mobile device 103a is attached to the network infrastructure 120 by establishing a communication link 121 with the transceiver 115a, which in turn is associated with a particular node 112a. In one embodiment of the present disclosure, this node 112a may be the sole access point for allowing the mobile device 103a to connect to the network infrastructure 120. Similarly, in another embodiment, the other mobile device 103b, at one point in time, accesses the network infrastructure 120 solely through another node 112b using a different wireless link 122. In this case, the first mobile device 103a and the second mobile device 103b may be separated by a significant geographical distance similar to the distance between two cities. For example, the first mobile device 103a and the second mobile device 103b may be located in different cells when the network infrastructure 120 is a cellular network. In an alternate embodiment, the first mobile device 103a and the second mobile device 103b could be connected to the network infrastructure 120 through the same node 112a. In this case, it is likely that the first mobile device 103a and the second mobile device 103b are within a closer geographic proximity. Regardless of whether a mobile device 103b communicates through one node 112a or another node 112b, the network infrastructure 120 may not facilitate the first mobile device 103a and the second mobile device 103b from discovering each other's presence within the network infrastructure 120. In other words, network infrastructure 120 may not facilitate direct communication between end devices. This is similar to a star topology where a node 112a is the hub of the star and mobile devices 103a and 103b form the appendages of the star.

In one embodiment of the present disclosure a node 112b within network infrastructure 120 is an end device such as a mobile device. In this embodiment, the node 112b can communicate using the network infrastructure 120 by establishing a wireless link with a transceiver 115b.

When the network infrastructure 120 is a cellular network, the first mobile device 103a may communicate with another mobile device 103b though the use of one or more nodes 112a-112N, which function as intermediary nodes. Furthermore, a mobile device 103a may communicate with another mobile device 103b by manually initiating communication (e.g., manually dialing a phone number, etc.).

Additionally, in FIG. 2, some mobile devices 104 and 105 are excluded from the network infrastructure 120. For example, a mobile device 104 may be out of range to access the network infrastructure 120. Thus, if the mobile device 104 moved within wireless range of a transceiver 115, for example, then the mobile device 104 could attach to the network infrastructure 120. In one example of the present disclosure, mobile devices within a wireless ad hoc network 140 (FIG. 1) can detect whether other mobile devices in the wireless ad hoc network 140 can access the network infrastructure 120.

In another example, a mobile device 105 may be excluded from the network infrastructure 120 because the mobile device 105 might lack the functionality to join the network infrastructure 120 due to physical limitations.

FIG. 2 also shows an example of a telecommunication environment 100 where mobile devices 103a, 103b, 104, and 105 are included within a wireless ad hoc network 140. As an example, these mobile devices of the telecommunication environment 100 can be any portable device equipped for wireless communication. Some specific examples include cell phones, computer laptops, computer tablets, computer notebooks, personal digital assistants, hand held media players, and other devices.

FIG. 2 exemplifies a way in which mobile devices can establish communication links with one another. Communication links 141-145 may comprise, for example, any wireless connection between devices that facilitate communication. For example, a first mobile device 103b can directly establish a communication link 143 to a second mobile device 104 over a wireless ad hoc network 140. As an alternative, the first mobile device 103b can communicate with a second mobile device 104 using combination of communication links 141 and 142. This example requires a third mobile device 103a to route communication signals between the first mobile device 103b and the second mobile device 104.

As a second alternative, the first mobile device 103b can communicate with the second mobile device 104 using a different combination of communication links 145 and 144. In this example, a different mobile device 105 must route communication signals between the first mobile device 103b and the second mobile device 104. By providing more than one option for connectivity between the two mobile devices 103b and 104, communication is not completely dependent on the presence or proximity of other mobile devices 103a and 105 that function like routing devices within the wireless ad hoc network 140. Specifically, the wireless ad hoc network 140 can be configured to be a self-healing mesh network.

Mobile devices may freely enter and leave the wireless ad hoc network. When a mobile device 103a enters the wireless ad hoc network 140, new communication links 141 and 142 may be formed. Consequently, if that mobile device leaves the wireless ad hoc network 140, those communication links will become unavailable. Thus, permitting the mobile devices within the wireless ad hoc network 140 to use any available communication link 141-145 allows for effective communication throughout a dynamically changing wireless ad hoc network. In other words, communication links 141-145 may or may not exist depending on whether the respective mobile devices are included in wireless ad hoc network 140. This provides many benefits to the telecommunication environment 100. For example, communication links 141-145 may bridge gaps within a network infrastructure 120 or may bridge gaps between other network infrastructures. Furthermore, the communication links 141-145 can assist in bypassing a network infrastructure 120 when the infrastructure is unavailable.

FIG. 2 further shows an example of components of a mobile device within the telecommunication environment 100. For instance, mobile devices 103a-103N, 104 and/or 105 may include a wireless transmitter 162. The wireless transmitter 162 enables a mobile device to communicate over the network infrastructure 120. Additionally the mobile device may include a communication system 150, which enables the mobile device to communicate over the wireless ad hoc network 140. Specifically, the communication system 150 assists in establishing communication links 141-145. Furthermore, the communication system 150 may use a memory buffer 164 to store messages sent over the communication links established within the wireless ad hoc network 140.

In one instance, the communication system 150 includes a controller 153 for allowing the communication system 150 to use the wireless transmitter 162. In one embodiment, a mobile device 103a-103N includes a second wireless transmitter 163 that can be controlled by the controller 153. In this embodiment, the second wireless transmitter 163 can be dedicated to facilitate communication over the wireless ad hoc network 140 while the first wireless transmitter 162 can be dedicated to facilitate communication over the network infrastructure 120. In an alternate embodiment, a mobile device 103a-103N, 104, and 105 may include a plurality of wireless transmitters to effectuate communication over the wireless ad hoc network 140 and the network infrastructure 120. For example, a mobile device 103a-103N, 104, and 105 includes a first wireless transmitter 162 for facilitating communication over the network infrastructure 120 as well as one or more wireless transmitters for facilitating communication over the wireless ad hoc network 140.

The communication system 150 may also include access module 154 for tracking a pattern of access to other mobile devices in wireless ad hoc network 140. In addition, the communication system 150 may include a resource manager 152 which enables a mobile device 103a to requisition remote resources of other mobile devices 103b-103N, 104, and 105 within the wireless ad hoc network 140. Additionally the resource manager 152 manages local computer resources of the mobile device 103a and facilitates access of other mobile devices 103b-103N, 104, and 105 within the wireless ad hoc network 140 to local computer resources of the mobile device 103a. The communication system 150 may further include a policy manager 151 to assist the resource manager 152 to set policies for granting access.

Additionally, a user interface 165 allows a user of the mobile device 103a to set policies using the policy manager 151. The communication system 150 may use a processor 161 to assist in implementing any of the functionality discussed above of the mobile device 103a. The mobile device 103a may also include one or more mobile applications 171 for execution on the mobile device 103a. For example, a mobile application 171 may be a video game, utility program, calculator, media player, data processor, or any other computer program of the like.

FIG. 2 alternatively depicts different configurations of components and communication links which exist within telecommunication environment 100. In one example, a wireless transmitter 162 is included in a mobile device 103a. The wireless transmitter 162 enables the mobile device 103a to communicate over the network infrastructure 120. Additionally, the mobile device 103 includes a communication system 150 that is configured to enable the mobile device 103a to communicate with another mobile device 103b over the wireless ad hoc network 140. The communication system 150 is further configured to establish communication with a node 112b within the network infrastructure 120 through a communication link 141 with the other mobile device 103b using the wireless ad hoc network 140. Next, the communication system 150 of the mobile device 103a can be configured to facilitate receiving an electronic message from the other mobile device 103b over the wireless ad hoc network 140. The communication system 150 of the mobile device 103a may also be configured to facilitate forwarding the electronic message to another node 112a within the network infrastructure 120.

The mobile device 103a depicted in FIG. 2 demonstrates another embodiment of the present disclosure. Specifically, mobile devices 103a-103N, 104 and 105 within the telecommunication environment 100 may include a single wireless transmitter 162. This transmitter may comprise a single antenna or may comprise multiple antennas. In either case, the transmitter is configured to enable communication over a network infrastructure 120. Furthermore, a communication system 150 of a mobile device 103a-103N, 104 and 105 may also control the wireless transmitter 162 to communication over a wireless ad hoc network 140. In this case, the communication system 150 may use a controller 153 to transition the wireless transmitter from communication over the network infrastructure 120 to communication over the wireless ad hoc network 140. Alternatively, the communication system 150 may use a controller 153 to disable the wireless transmitter 162 to allow switching between access to the network infrastructure 120 and access to the wireless ad hoc network 140.

In an alternate embodiment depicted in FIG. 2, a mobile device 103a-103N, 104 and 105 within the telecommunication environment 100 may include a first wireless transmitter 162 and a second wireless transmitter 163. In this case, one wireless transmitter 162 is dedicated to enable communication over the network infrastructure 120 while the second transmitter is dedicated to enable wireless communication over the wireless ad hoc network 140.

The components and functionality described with respect to the mobile device 103a may exist with regard to any mobile device 103b-103N, 104 and 105 within the telecommunication environment 100.

Figure 3:
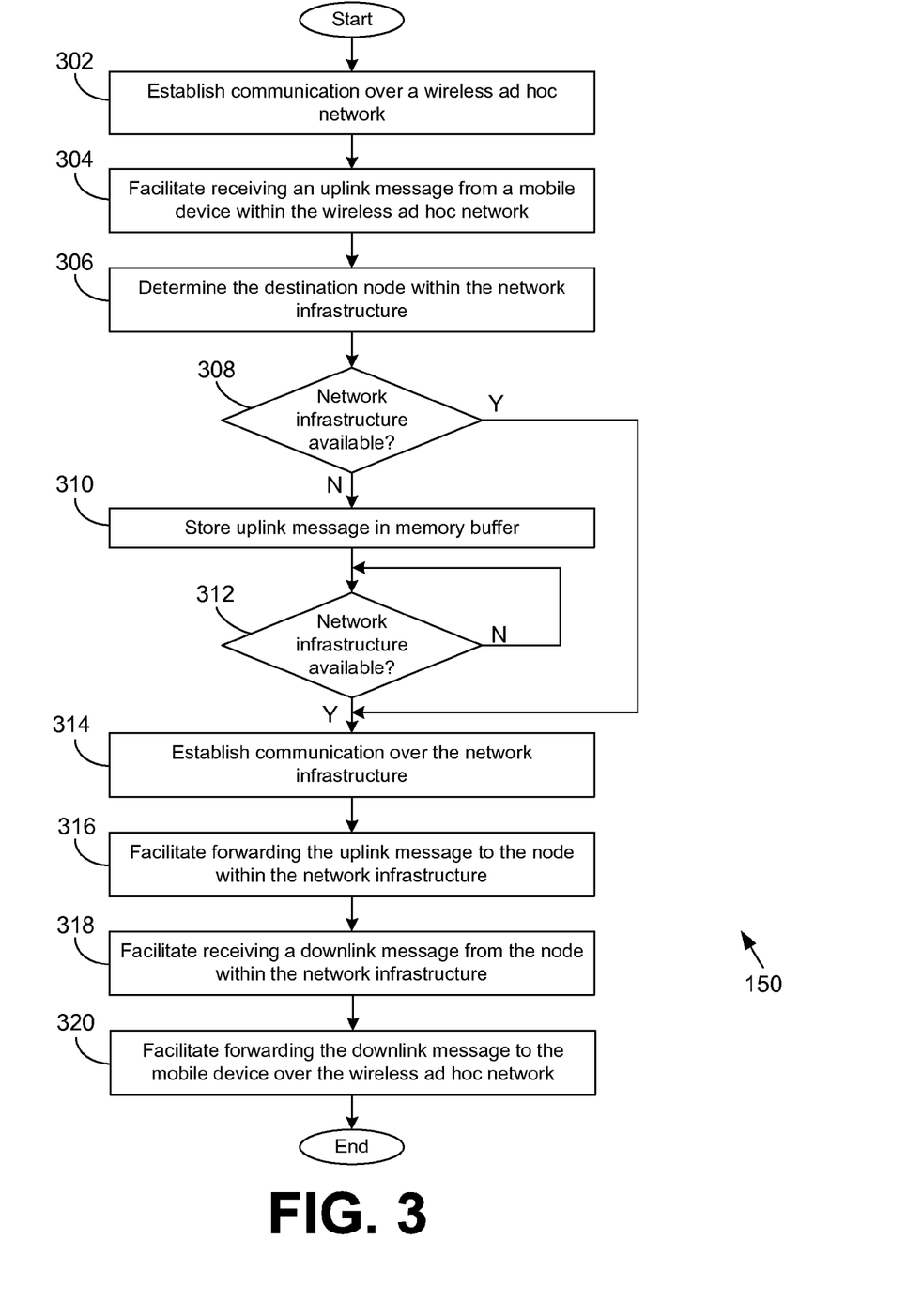
FIG. 3 is a flowchart illustrating one example of functionality implemented as portions of a communication system in a mobile device in the telecommunication environment of FIG. 1 according to various embodiments of the present disclosure.

Referring next to FIG. 3, shown is a flow chart that depicts one example of the operation of a communication system 150 (FIG. 2) within a mobile device 103a-103N, 104, and 105 (FIGS. 1 and 2) of telecommunication environment 100 (FIG. 1). It is understood that the flowchart of FIG. 3 provides merely an example of the many different types of functional arrangements that may be employed to implement the operation of the portion of the communication system 150 as described herein. As an alternative, the flowchart of FIG. 3 may be viewed as depicting an example of steps of a method implemented in a mobile device 103a-103N, 104, and/or 105 according to one or more embodiments. Specifically, the flow chart of FIG. 3. demonstrates steps a communication system can take to facilitate transmission of electronic messages using a wireless ad hoc network 140 (FIG. 1) and a network infrastructure 120 (FIG. 1).

To begin, in box 302, a mobile device 103a-103N, 104, and/or 105 within a telecommunication environment 100 establishes communication over a wireless ad hoc network 140. In one example, the mobile device 103a-103N, 104, and/or 105 may use a communication system 150 to join the wireless ad hoc network 140 using a wireless transmission protocol. In this case, the wireless ad hoc network 140 has been created by at least two other mobile devices within the wireless ad hoc network 140. Thus, the wireless ad hoc network 140 exists prior to the joining of the mobile device 103a-103N, 104, and/or 105.

As a second example, prior to existence of the wireless ad hoc network 140, a mobile device 103a can discover at least one other mobile device 103b, 104, and 105 within a range of communication over a potential wireless ad hoc network 140. After discovery, the mobile device 103a can begin forming a wireless ad hoc network 140 using various techniques employing wireless transmission protocols to discover and communicate with other devices. In one embodiment of the present disclosure, the communication system 150 of the mobile device 103a is configured to facilitate an automatic joining or an automatic forming of the wireless ad hoc network 140. This requires no user interaction with the mobile device 103a with regard to establishing communication over the wireless ad hoc network 140. In another embodiment of the present disclosure, the user of the mobile device 103a can use its communication system 150 to manually join or form the wireless ad hoc network 140. This would typically require a user to interact with a user interface 165 (FIG. 2) for establishing communication over the wireless ad hoc network 140.

In box 304, the communication system 150 of the mobile device 103a facilitates receiving an uplink message from another mobile device 103b-103N, 104, and/or 105 within the wireless ad hoc network 140 using at least one communication link 141-145 (FIG. 2). An uplink message can be a basic electronic message, an SMS text message, an application file or any data or control message.

Next, in box 306, the communication system 150 determines the destination node within the network infrastructure. This can involve verifying that the uplink message is intended to be sent to a node 112a-112N within the network infrastructure 120. In one embodiment, the uplink message includes a destination address for a node 112a-112N for directing the uplink message to the node 112a-112N.

In box 308, the communication system 150 determines if the network infrastructure 120 is available to the mobile device 103a. For example, the network infrastructure 120 provides wide coverage to many mobile devices using a cell tower. As mobile devices move throughout a geographical range, availability to the network can frequently change.

If the network is unavailable to the mobile device 103a, for example, then the communication system 150 may store the uplink message in a memory buffer 164 according to box 310.

In box 312, the communication system 150 repeatedly checks for availability to the network infrastructure 120. Throughout these repeated checks, the uplink message is stored in the memory buffer 164. When the network infrastructure 120 is available, the communication system 150 establishes communication with the network infrastructure 120 as seen in box 314.

In box 316, the communication system 150 facilitates forwarding the uplink message to a node within the network infrastructure 120. In box 318, the communication system 150 may facilitate receiving a downlink message from the node within the network infrastructure. In one case, the downlink message may be a confirmation or acknowledgement of receipt. Upon receiving the downlink message, the communication system 150 may store the downlink message in the memory buffer 164 when communication with the recipient mobile device (e.g. the mobile device that originated the uplink message, etc.) over the wireless ad hoc network 140 is unavailable. And accordingly, if communication between the mobile device 103a and the recipient mobile device is lost at some point in time after the mobile device 103a receives the downlink message, then the mobile device 103a can store the downlink message in the memory buffer 164. As seen in box 320, whenever communication with the recipient mobile device becomes available over the wireless ad hoc network 140, the communication system 150 may facilitate forwarding the downlink message to the recipient device using the wireless ad hoc network 140.

Thus, the functionality of the communication system depicted in FIG. 3 demonstrates the relationship between a wireless ad hoc network 140 and a network infrastructure 120. For example, in one case, a mobile device 104 is capable of joining the network infrastructure 120, but is unable to do so. Furthermore, the mobile device 104 wants to communicate over the network infrastructure 120. Another mobile device 103a can assist the mobile device 104 by establishing communication over the wireless ad hoc network 140 and then functioning as an intermediary device to route messages between a node 112a in the network infrastructure 120 and the mobile device 104. Furthermore, as mentioned above, the communication system 150 includes the capability of facilitating this routing function while communication between the mobile device 103a and the node 112a with network infrastructure 120 is intermittent by using the memory buffer 164.

Figure 4:
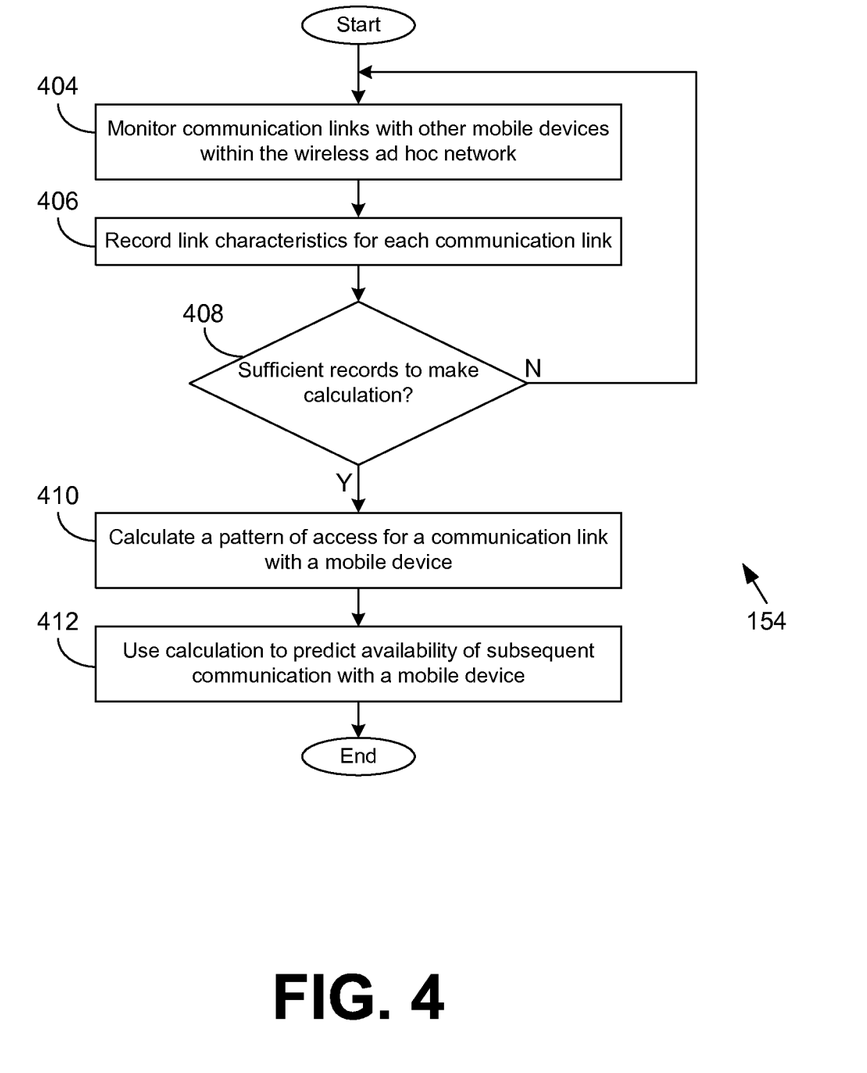
FIG. 4 is a flowchart illustrating another example of functionality implemented as portions of an access module in a mobile device in the telecommunication environment of FIG. 1 according to various embodiments of the present disclosure.

Turning now to FIG. 4, shown is a flowchart that provides one example of the operation of an access module 154, which operates as a portion of the communication system 150 (FIG. 2) according to various embodiments. It is understood that the flowchart of FIG. 4 provides merely an example of the many different types of functional arrangements that may be employed to implement the operation of the portion of the access module 154 as described herein. As an alternative, the flowchart of FIG. 4 may be viewed as depicting an example of steps of a method implemented by mobile devices 103a-103N, 104 and/or 105 (FIGS. 1 and 2) according to one or more embodiments. Specifically FIG. 4. explains tracking a pattern of access to a mobile device within a wireless ad hoc network 140 (FIG. 1).

To begin, in box 404, the access module 154 monitors communication links with mobile devices within the wireless ad hoc network 140. For example, the access module 154, which is included within a first mobile device 103a, may monitor whether a communication link 141 (FIG. 2) with a second mobile device 103b exists. Specifically, the communication link 141 can exist when the first mobile device 103a and the second mobile device 103b are both included in the wireless ad hoc network 140. Additionally, the access module 154 may monitor when other communication links 142-145 (FIG. 2) with other mobile devices are available.

In box 406, the access module 154 records link characteristics for each communication link 141-145. For example, the access module 154 may record the time and/or duration of the communication link 141 between the first mobile device 103a and the second mobile device 103b. In one embodiment of the present disclosure, the access module 154 of the first mobile device 103a may maintain a table of records for each other mobile device with which the first mobile device 103a establishes a communication link. So, as an example, the first mobile device 130a may maintain a separate table for the second mobile device 103b, a third mobile device 104, and a fourth mobile device 105.

Each table may include at least one record. In addition to time and/or duration of the communication link, records may further include information relating to signal strength characteristics, device characteristics, and device policies.

In box 408, the access module 154 determines whether a particular table of records includes sufficient records from which a pattern of access calculation may be calculated or otherwise determined. If too few records exist (e.g., a number that falls below a threshold amount, etc.) then the access module 154 will continue monitoring the available links within a wireless ad hoc network 140. This may eventually lead to a sufficient amount of records to make a pattern of access calculation. However, if sufficient records do exist, then the access module 154 is prepared to make a calculation. In box 410, the access module 154 calculates a pattern of access for a communication link with respect to a mobile device. Expanding on the example above, if the table of records with regard to the second mobile device 103b includes many records indicating that a communication link 141 exists approximately for one hour on most weekday evenings, then the access module 154 may determine that a pattern exists. Specifically, the calculation can indicate that mobile device 103b is generally available at a particular time on a particular day. Here the time would be evenings and the day would be weekdays.

In box 412, the access module 154 may use the calculation described in box 410 to predict the occurrence of subsequent communication links with a mobile device. For instance, the access module 154 can notify other components of the communication system 150 of the first mobile device 103a that future communications with the second mobile device 103b at a particular point in time is to be expected. The communication system 150 may use this prediction in a variety of ways. In a first example, the communication system 150 can notify the user of the first mobile device 103a using user interface 165 (FIG. 1) whether a potential opportunity exists to establish a connection with the second mobile device 103b. In a second example, the communication system 150 may use the prediction to store buffered messages for sharing over a potential wireless ad hoc network 140 that may be established at some future point in time.

Figure 5:
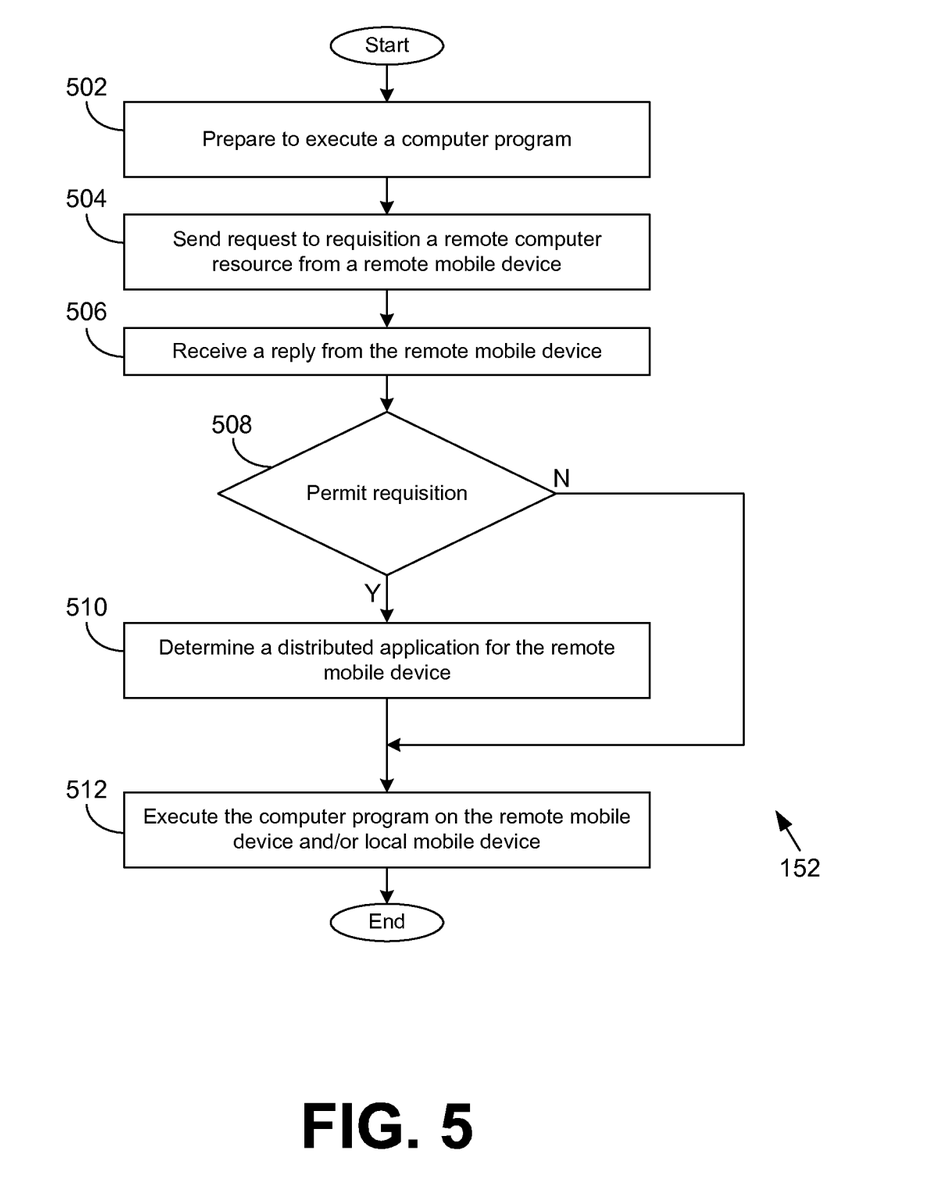
FIG. 5 is a flowchart illustrating a third example of functionality implemented as portions of a resource manager in a mobile device in the telecommunication environment of FIG. 1 according to various embodiments of the present disclosure.

Moving on to FIG. 5, shown is a flowchart that provides one example of the operation of a resource manager 152 within a communication system 150 (FIG. 2) according to various embodiments. It is understood that the flowchart of FIG. 5 provides merely an example of the many different types of functional arrangements that may be employed to implement the operation of the portion of the resource manager 152 as described herein. As an alternative, the flowchart of FIG. 5 may be viewed as depicting an example of steps of a method implemented in mobile devices 103a-103N, 104, and/or 105 (FIG. 1) according to one or more embodiments.

Specifically, FIG. 5 demonstrates a manner in which a resource manager 152 can use a wireless ad hoc network 140 (FIG. 1) to create a dynamic cloud for distributed processing. In other words, the resource manager 152 of a mobile device 103a-103N, 104, and/or 105 within the wireless ad hoc network 140 can segment a computer program such that the segments of the computer program can run in parallel over the wireless ad hoc network 140.

To begin, a mobile device 103a prepares to execute a computer program. For example, the mobile device 103a may prepare its processor 161 (FIG. 2) to execute a computer program or any other mobile application 171 (FIG. 2). Upon this preparation, according to box 502, the resource manager 152 may be notified that the mobile device 103a intends to execute the computer program. In one embodiment, the communication system 150 can verify that the mobile device 103a is configured to communicate over the wireless ad hoc network 140 with at least one other mobile device.

In box 504, the resource manager 152 facilitates sending a request to a remote mobile device 103b within the wireless ad hoc network 140 to requisition a remote computer resource from the remote mobile device 103b. In this case, the mobile device 103a has established a communication link 141 (FIG. 1) with a remote mobile device 103b. Furthermore, the remote mobile device 103b has computer resources for use by other mobile devices 103c-103N, 104 and/or 105 within wireless ad hoc network 140. The request can be an inquiry as to whether the remote mobile device 103b is willing and able to execute a process using a processor within the remote mobile device 103b for the benefit of the mobile device 103a. Accordingly, in box 506, the resource manager 152 receives a reply from the remote mobile device 103b. In one example, the remote mobile device 103b may reply to the mobile device 103a by declining the request. If this is the case, as seen in box 508, the resource manager moves to box 512 and may instruct the mobile device 103a to execute the program using the processor 161 of the mobile device 103a without relying on the computer resources of the remote mobile device 103b.

However if, in box 508, the remote mobile device 103b permits a requisition of its computer resources, then the mobile device 103a that made the request determines a distributed application for the remote mobile device 103b, as seen in box 510. For instance, once the resource manager 152 receives a reply permitting requisition of the remote resources of the remote mobile device 103b, the mobile device 103a may then transform the computer program to be executed as a distributed application. Here, the resource manager 152 segments the computer program for executing the segments in parallel. After the resource manager 152 creates the segments and transforms the computer program into a distributed application, the resource manager facilitates sending at least one instruction to the remote mobile device 103b to execute a part of the distributed application.

Finally, in box 512, the computer program is executed using the mobile device 103a. And, if the requisition of the resources of the remote mobile device 103b is permitted, then the computer program is executed using both the mobile device 103a and the remote mobile device 103b.

In a first embodiment of the disclosure pertaining to FIG. 5, the computer resource subject to requisitioning can be computer memory. In this case, rather than determining a distributed application, a resource manager 152 of a mobile device will calculate an amount of memory required for executing a computer program and then the resource manager 152 will instruct a remote mobile device to effectively supply that memory. As an illustration, the mobile device 103a can execute a computer program while relying on the memory located in the remote mobile device 103b. Specifically, the request to requisition computer resources of the remote mobile device 103b will specify a request for memory.

In a second embodiment of the disclosure pertaining to FIG. 5, a mobile device 103a can rely on more than one other mobile device 103b-103N, 104, and/or 105 in the wireless ad hoc network 140 to execute the distributed application. Here, the wireless ad hoc network 140 may function like a mesh network and therefore, the execution of the computer program may resemble that of a dynamically created cloud of mobile devices that effectively aggregate their respective computer resources to execute a distributed application. Accordingly, a separate request to requisition computer resources should be sent to each participating mobile device 103b-103N, 104, and 105.

In a third embodiment of the disclosure pertaining to FIG. 5, the remote mobile device 103b may need specific software required to execute the distributed application for the benefit of the mobile device 103a. If this is the case, the remote mobile device 103b may be instructed to download the specific software from another mobile device within the wireless ad hoc network 140 or from a node within the network infrastructure 120. For example, a local mobile device 103a may execute a program X using software Y. A remote mobile device 103b can assist the local mobile device 103a, however, the remote mobile device 103b does not have software Y locally installed. The remote mobile device 103b can obtain software Y over a wireless ad hoc network 140 or over a network infrastructure 120.

In a fourth embodiment of the disclosure pertaining to FIG. 5, a policy manager 151, which may be part of the communication system 150, of the mobile device 103b may include policies for permitting, denying, or limiting the computer resources subject to requisitioning. As an example, one policy may be to limit the amount of memory that the remote mobile device 103b is willing to allocate to other mobiles devices. Another example of a policy is limiting the amounts of processing resources a mobile device 103b is willing to lend. This can be limited based on the number of computer instructions a processor of the remote mobile device 103b is willing to execute for another mobile device. Another example is a policy that denies all requests for requisitioning if the battery life of the remote mobile device 103b falls below a threshold amount. In this fourth embodiment, a user may also implement policies using user interface 165 (FIG. 1).

In a fifth embodiment of the disclosure pertaining to FIG. 5, the communication system 150 of mobile device 103a may facilitate the requisitioning of a remote computer resource of the remote mobile device 103b when a degree of signal strength between the mobile device 103a and the remote mobile device 103b exceeds a threshold amount. Specifically, this regards strength pertaining to a communication link 141. The communication system 150 may assess the conditions of the signal strength prior to sending a request to requisition remote resources. If the signal strength is weak with respect to the remote mobile device 103b, then the mobile device 103a may decide to forgo requisitioning computer resources from the remote mobile device 103b. Alternatively, if the communication system 150 of a mobile device 103a determines that the communication link 141 will have a probability of low duration, then the mobile device 103a may decide to forgo requisitioning computer resources from the remote mobile device 103b. The communication system 150 may use the pattern of access calculation to decide whether to request to requisition resources.

Figure 6:
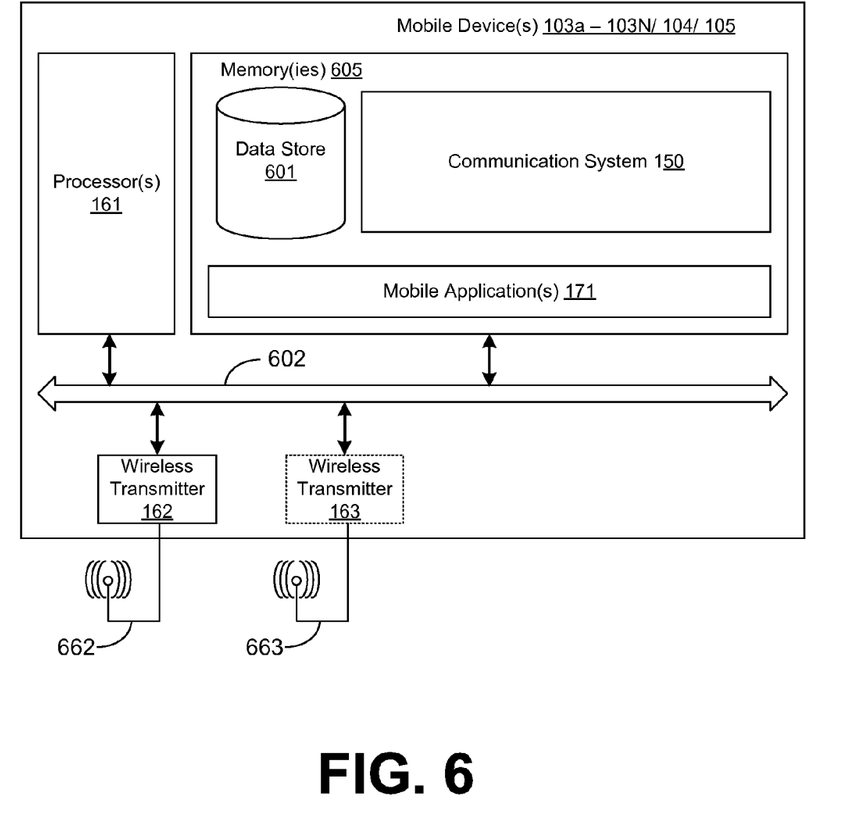
FIG. 6 is a schematic block diagram that provides one illustration of a mobile device employed in the telecommunication environment of FIG. 1 according to various embodiments of the present disclosure.

With reference to FIG. 6, shown is a schematic block diagram of the mobile device 103a-103N, 104, and/or 105 according to an embodiment of the present disclosure. Mobile devices 103a-103N, 104, and 105 within the telecommunication environment 100 (FIG. 1) may include at least one processor circuit, for example, having a processor 161 and a memory 605, both of which are coupled to a local interface 602. To this end, the mobile device may comprise, for example, at least one server computer or like device. The local interface 602 may comprise, for example, a data bus with an accompanying address/control bus or other bus structure as can be appreciated.

Additionally, mobile devices 103a-103N, 104, and 105 within the telecommunication environment 100 may further include a first wireless transmitter 162 and a second wireless transmitter 163. Both the first wireless transmitter 162 and the second wireless transmitter 163 may be coupled to the local interface 602. Furthermore, the first wireless transmitter may be coupled to an antenna(s) 662 and similarly, the second transmitter may be coupled to an antenna(s) 663. The antennas 662 and 663 may be configured to facilitate wireless communication over, for example, using a network infrastructure 120 (FIG. 1) or using a wireless ad hoc network 140 (FIG. 1).

Stored in the memory 605 are both data and several components that are executable by the processor 161. In particular, stored in the memory 605 and executable by the processor 161 are mobile applications 171, a communication system 150, and potentially other applications. Also stored in the memory 605 may be a data store 601 and other data. In addition, an operating system may be stored in the memory 605 and executable by the processor 161.

It is understood that there may be other applications that are stored in the memory 605 and are executable by the processors 161 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 605 and are executable by the processor 161. In this respect, the term "executable" means a program file that is in a form that can ultimately be run by the processor 161. Examples of executable programs may be, for example, a compiled program that can be translated into machine code in a format that can be loaded into a random access portion of the memory 605 and run by the processor 161, source code that may be expressed in proper format such as object code that is capable of being loaded into a random access portion of the memory 605 and executed by the processor 161, or source code that may be interpreted by another executable program to generate instructions in a random access portion of the memory 605 to be executed by the processor 161, etc. An executable program may be stored in any portion or component of the memory 605 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 605 is defined herein as including both volatile and nonvolatile memory and data storage components. Volatile components are those that do not retain data values upon loss of power. Nonvolatile components are those that retain data upon a loss of power. Thus, the memory 605 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 161 may represent multiple processors 161 and the memory 605 may represent multiple memories 605 that operate in parallel processing circuits, respectively. In such a case, the local interface 602 may be an appropriate network that facilitates communication between any two of the multiple processors 161, between any processor 161 and any of the memories 605, or between any two of the memories 605, etc. The local interface 602 may comprise additional systems designed to coordinate this communication, including, for example, performing load balancing. The processor 161 may be of electrical or of some other available construction.

Although communication system 150, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4 and 5 show the functionality and operation of an implementation of portions of the communication system 150. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 161 in a computer system or other system. The machine code may be converted from the source code, etc. If embodied in hardware, each block may represent a circuit or a number of interconnected circuits to implement the specified logical function(s).

Although the flowcharts of FIGS. 3, 4 and 5 show a specific order of execution, it is understood that the order of execution may differ from that which is depicted. For example, the order of execution of two or more blocks may be scrambled relative to the order shown. Also, two or more blocks shown in succession in FIGS. 3, 4 and 5 may be executed concurrently or with partial concurrence. Further, in some embodiments, one or more of the blocks shown in FIGS. 3, 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including communication system 150, that comprises software or code can be embodied in any non-transitory computer-readable medium for use by or in connection with an instruction execution system such as, for example, a processor 161 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A first mobile device comprising:
   a wireless transmitter included in the first mobile device, the wireless transmitter enabling the first mobile device to establish a direct communication over a network infrastructure; and
   a communication system in the first mobile device, the communication system configured to:
      establish, via the wireless transmitter, communication over a wireless ad hoc network with a second mobile device, wherein the wireless ad hoc network is separate from the network infrastructure;
      facilitate receiving an uplink message from the second mobile device over the wireless ad hoc network, the uplink message being directed to intended for a node within the network infrastructure;
      store the uplink message in a memory buffer when the direct communication over the network infrastructure is unavailable to the first mobile device;
      facilitate forwarding the uplink message to the node using the network infrastructure at a time after the direct communication over the network infrastructure is available to the first mobile device;
      facilitate receiving a downlink message from the node over the network infrastructure, the downlink message being intended for the second mobile device, wherein the second mobile device is not in direct communication with the network infrastructure; and
      calculate a pattern of access for a communication link with the second mobile device over the wireless ad hoc network, wherein the communication system is further configured to either:
         store the downlink message in the memory buffer when the communication link is unavailable with the second mobile device over the wireless ad hoc network and predicted to become available at a particular point in time based at least in part on the calculated pattern of access for the communication link with the second mobile device; and
         facilitate forwarding the downlink message to the second mobile device over the communication link with the second mobile device at the particular point in time in which the communication link was predicted to be available using the wireless ad hoc network; or
         facilitate discarding the downlink message intended for the second mobile device when the communication link is not predicted to become available based at least in part on the calculated pattern of access for the communication link with the second mobile device.

2. The first mobile device of claim 1, wherein the network infrastructure is a cellular network.

3. The first mobile device of claim 1, wherein the communication system is further configured to detect whether the second mobile device is configured to communicate over the network infrastructure.

4. A system, comprising:
   a first mobile device;

a wireless transmitter included in the first mobile device, the wireless transmitter enabling the first mobile device to communicate over a network infrastructure; and a communication system in the first mobile device, the communication system being configured to:

enable the first mobile device to communicate with a second mobile device over a wireless ad hoc network, wherein the wireless ad hoc network is separate from the network infrastructure;

establish communication with a first node within the network infrastructure through a link with the second mobile device using the wireless ad hoc network, wherein the first mobile device relays communications between the first node and the second mobile device via the first mobile device communicating with the second mobile device over the wireless ad hoc network and the first mobile device communicating with the first node over the network infrastructure;

facilitate receiving an electronic message from the first node over the network infrastructure, the electronic message being intended for the second mobile device;

calculate a pattern of access for a communication link of the first mobile device with the second mobile device in the wireless ad hoc network, wherein buffering of the electronic message by the first mobile device is based at least in part on the calculated pattern of access for the communication link with the second mobile device in the wireless ad hoc network;

store the electronic message in a memory buffer when direct communication with the second mobile device is unavailable to the first mobile device and is predicted to become available at a particular point in time over the wireless ad hoc network based at least in part on the calculated pattern of access for the communication link of the first mobile device with the second mobile device in the wireless ad hoc network; and forward the electronic message to the second mobile device over the wireless ad hoc network at the particular point in time.

5. The system of claim 4, wherein the network infrastructure is a cellular network.

6. The system of claim 4, wherein enabling the first mobile device to communicate with the second mobile device over the wireless ad hoc network comprises using the wireless transmitter.

7. The system of claim 6, wherein the communication system is further configured to transition the wireless transmitter from communicating over the network infrastructure to communicating over the wireless ad hoc network.

8. The system of claim 6, wherein the communication system is further configured to disable the wireless transmitter.

9. The system of claim 4, wherein the wireless transmitter is a first wireless transmitter, and wherein communicating with the second mobile device over the wireless ad hoc network comprises using a second wireless transmitter included in the first mobile device.

10. The system of claim 4, wherein the wireless ad hoc network is a mesh network including a third mobile device.

11. A method, comprising:

calculating, by a first mobile device, a pattern of access for a communication link with a second mobile device in a wireless ad hoc network, wherein a scheduling of a subsequent communication with the second mobile device is based at least in part on the calculated pattern of access for the communication link with the second mobile device in the wireless ad hoc network;

establishing communication with the second mobile device using the first mobile device over the wireless ad hoc network based at least in part on the calculated pattern of access for the communication link with the second mobile device in the wireless ad hoc network, the wireless ad hoc network being separate from a network infrastructure to a second network, wherein the second mobile device is in communication with the network infrastructure; and requisitioning, using the first mobile device, a remote computer resource of the second mobile device over the wireless ad hoc network, wherein the requisitioning comprises;

sending, to the second mobile device, application data to be processed via the remote computer resource of the second mobile device, wherein the second mobile device is instructed to download specific application software, from a node within the infrastructure, the specific application software being configured to execute the application data; and obtaining an output from the second mobile device after completion of processing the application data.

12. The method of claim 11, further comprising:

receiving, in the second mobile device, an electronic message from a second node within the network infrastructure; and forwarding, using the second mobile device, the electronic message to the first mobile device over the wireless ad hoc network.

13. The method of claim 11, wherein the network infrastructure is a cellular network.

14. The method of claim 11, wherein the wireless ad hoc network is a mesh network.

15. The method of claim 11, wherein the remote computer resource is employed to assist the first mobile device in executing an application.

16. The method of claim 11, wherein requisitioning the remote computer resource is implemented when a degree of signal strength between the first mobile device and the second mobile device exceeds a threshold level.

17. The method of claim 11, further comprising facilitating an access by the second mobile device to a local computer resource included in the first mobile device.

18. The method of claim 17, further comprising implementing, in the first mobile device, at least one policy that manages the access by the second mobile device to the local computer resource.

19. A non-transitory computer-readable medium embodying at least one program executable in a computing device, the at least one program having instructions that perform a method comprising:

enabling a first mobile device to communicate with a second mobile device over a wireless ad hoc network, the wireless ad hoc network being separate from a network infrastructure to a second network;

facilitating a requisitioning of a computer resource of the second mobile device over the wireless ad hoc network, wherein the requisitioning comprises:

sending, to the second mobile device, application data to be processed via the computer resource of the second mobile device, wherein the second mobile device is instructed to download specific application software, from a node within the network infrastructure, the specific application software being configured to execute the application data; and obtaining an output from the second mobile device after completion of processing the application data; and facilitating receiving, in the first mobile device, an electronic message from the second mobile device over the wireless ad hoc network, wherein the second mobile device receives the electronic message from a node within the network infrastructure.

20. The computer-readable medium of claim 19 wherein facilitating the requisitioning of the computer resource comprises sending, to the second mobile device, a request to requisition the computer resource.

21. The computer-readable medium of claim 19 wherein facilitating the requisitioning of the computer resource comprises determining a distributed application for the second mobile device.

22. The computer-readable medium of claim 19 wherein facilitating the requisitioning of the computer resource comprises instructing the second mobile device to execute the specific application software.

23. The computer-readable medium of claim 19, wherein facilitating the requisitioning of the computer resource comprises attempting to requisition the computer resource when a degree of signal strength between the first mobile device and the second mobile device exceeds a threshold level.

* * * * *

UNITED STATES PATENT AND TRADEMARK OFFICE
CERTIFICATE OF CORRECTION

PATENT NO. : 9,072,117 B1  
APPLICATION NO. : 13/297823  
DATED : June 30, 2015  
INVENTOR(S) : Eric R. Channey Page 1 of 1

It is certified that error appears in the above-identified patent and that said Letters Patent is hereby corrected as shown below:

In the Claims
At column 14, line 23, replace "directed to intended for" with --intended for-- in claim 1.

Signed and Sealed this
Twelfth Day of April, 2016

Michelle K. Lee
*Director of the United States Patent and Trademark Office*